March 12, 1957   V. GEORGEFF   2,784,665
SAFETY KNUCKLE JOINT PRESS
Filed Oct. 6, 1951   4 Sheets-Sheet 2

INVENTOR.
VASIL GEORGEFF
BY Henry L. Shevier
ATTORNEY

March 12, 1957 V. GEORGEFF 2,784,665
SAFETY KNUCKLE JOINT PRESS
Filed Oct. 6, 1951 4 Sheets-Sheet 3
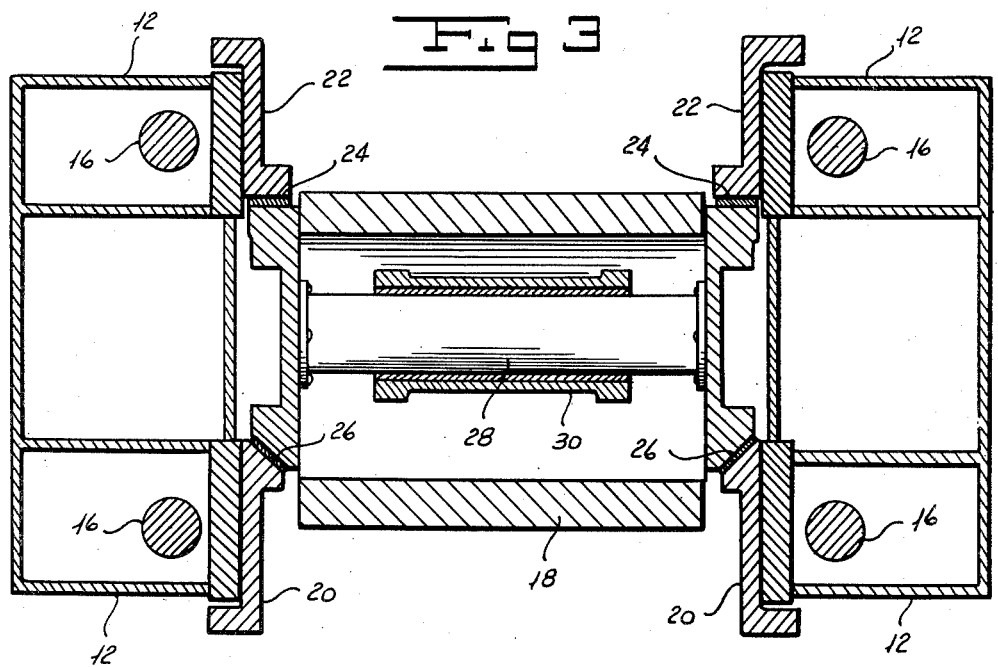
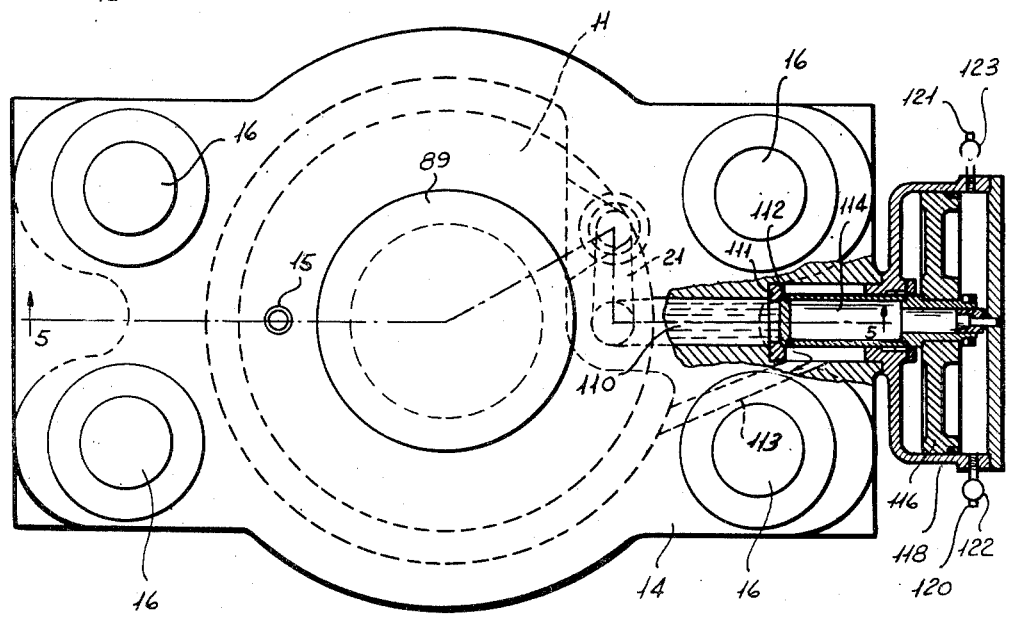
INVENTOR.
VASIL GEORGEFF
BY
ATTORNEY

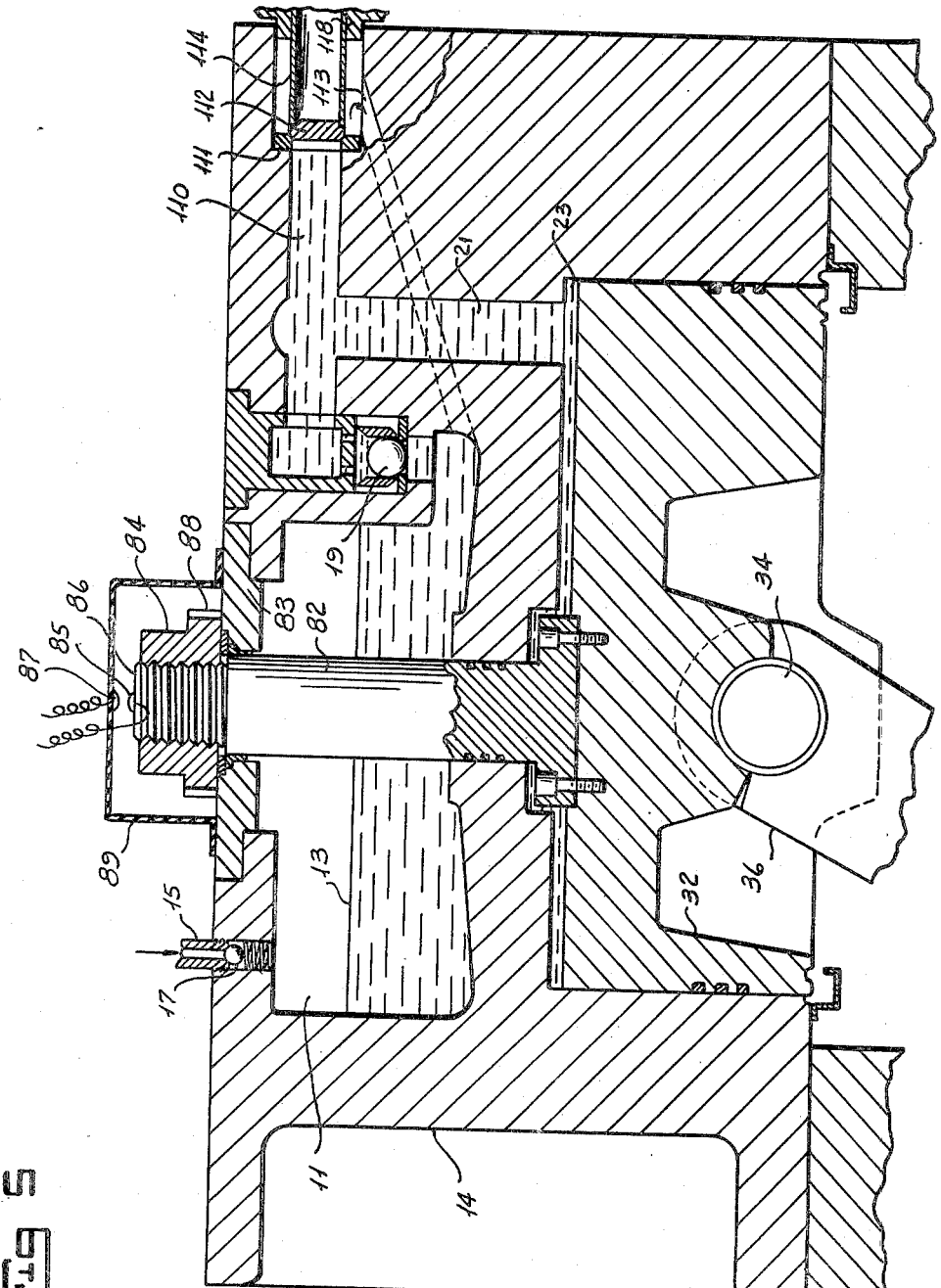

United States Patent Office 2,784,665
Patented Mar. 12, 1957

2,784,665

SAFETY KNUCKLE JOINT PRESS

Vasil Georgeff, La Grange Park, Ill., assignor to Danly Machine Specialties, Inc., Chicago, Ill., a corporation of Illinois Application October 6, 1951, Serial No. 250,172

1 Claim. (Cl. 100—53)

My invention relates to a safety knuckle joint press and more particularly to a knuckle joint press which will automatically compensate for variations in stock thickness and in which means are provided automatically to stop the press in event of an overload.

Knuckle joint presses are capable of developing tremendous thrusts due to the extreme mechanical advantage which can be developed by the mechanical motion of these presses. The knuckle joint press consists of a slide mounted for reciprocating motion in the press frame by means of a toggle linkage. One link of the toggle linkage is attached to the slide. The other link of the toggle linkage is normally attached to the press frame. The links are pivoted together at their other ends. A pitman is attached to the juncture of the toggle linkage which forms the knuckle. As the angle formed by the links approaches a straight angle a comparatively large amplitude of motion of the joint will produce a very small amplitude of motion of the slide thus resulting in a very large mechanical advantage thrust. In a given press the magnitude of this thrust is limited only by the ability of the links and wrist pins to withstand compression and the frame to resist the thrust.

Through inadvertence it occurs occasionally that a double thickness of stock is fed to the dies. Sometimes a particular piece of stock may be thicker than that for which the dies are designed and the press is adjusted. In such cases injury may occur to the dies, the tie rods of the press may stretch and acquire a permanent set, or the parts of the press may be strained beyond their elastic limit, doing injury to the press. It is desirable that the press be able to continue its cycle of operations and accommodate the double thickness of multiple stock or a piece of stock thicker than that for which the dies were designed without doing injury to the press or without stopping the press in the case of an accidental overload within certain limits.

The prior art has recognized this danger in knuckle joint presses and usually a provision is made for a safety bed. The stationary die is mounted on a bed which will yield beyond a predetermined pressure and thus prevent injury to the press and dies. When a safety bed is used, however, it is difficult to provide for an automatic feed. Furthermore, it is expensive to provide for an adjustment of the position of the slide since the links must be able to withstand the tremendous forces involved.

Then, too, in the prior art, if parts are stout enough to withstand unusual stresses a press may become stuck adjacent its bottom dead center and it is impossible to move the press without disassembling the tie rods and loosening them so that the press can be freed. This is a laborious and time-consuming task unless a safety bed is used.

It has been suggested by Isaac Patrick et al. in their Patent 2,236,154 that a conventional press having an eccentric be fitted with an hydraulic piston on which the bearing for the eccentric gear is mounted. In the Patrick disclosure the hydraulic piston is placed under a pressure equal to the maximum stress to be encountered for the rated working force for which the press was designed. In this manner the press acts exactly as a rigid press except that instead of elastic tie rods, for example, there is an hydraulic connection. When the press is loaded to beyond its maximum rated stress a relief valve permits the hydraulic fluid to escape to atmospheric pressure and the press is automatically stopped.

One object of my invention is to provide a safety knuckle joint press in which the upper link is mounted upon an hydraulic cylinder carried by the crown or upper portion of the press. The piston is so designed that it will yield under abnormal stresses occasioned by accidental feeding of double thickness of stock or the like while maintaining the desired thrust during the working stroke. Beyond the predetermined limit the press is automatically stopped.

Another object of my invention is to provide a knuckle joint press having a safety arrangement at the upper link so that an automatic feed can be used.

Other and further objects of my invention will appear from the following description.

The prime mover of a power press stores energy in a flywheel during the major part of the cycle of operation of the press. When it is desired to operate the press the constantly rotating flywheel is coupled by means of a clutch to the driving train of the press and this is simultaneously released by freeing the brake which normally immobilizes the driving train. Means are usually provided for controlling the clutching of the flywheel and the release of the brake or the unclutching of the flywheel and the setting of the brake.

In general, my invention contemplates the provision of an hydraulic system to place a predetermined pressure behind a thrust piston. This thrust piston is mounted adjacent the upper portion of the press. To the thrust piston I attach the upper link of the toggle linkage. The downward motion of the piston is limited by a piston rod the upper end of which is threaded and adjustably carries a nut. The position of this nut will determine the downward movement of the thrust piston and hence provides a simple means for adjusting the position of the slide. The control system for the clutch of the press contains a normally open switch. When the hydraulic piston yields beyond a predetermined limit this switch will be closed and will actuate a relay to de-energize the control solenoid for the air valve which controls the clutch and brake which control circuit is well known in the art and per se forms no part of the instant invention and hence is not shown or described.

In the accompanying drawings which form part of the instant specification and which are to be read in conjunction therewith and in which like reference numerals are used to indicate like parts in the various views:

Figure 3 is a sectional view drawn on an enlarged scale taken along the line 3—3 of Figure 2.

Figure 4 is a fragmentary plan view drawn on an enlarged scale viewed along the line 4—4 of Figure 2.

Figure 5 is a sectional view drawn on an enlarged scale taken along the line 5—5 of Figure 4.

Figure 1:
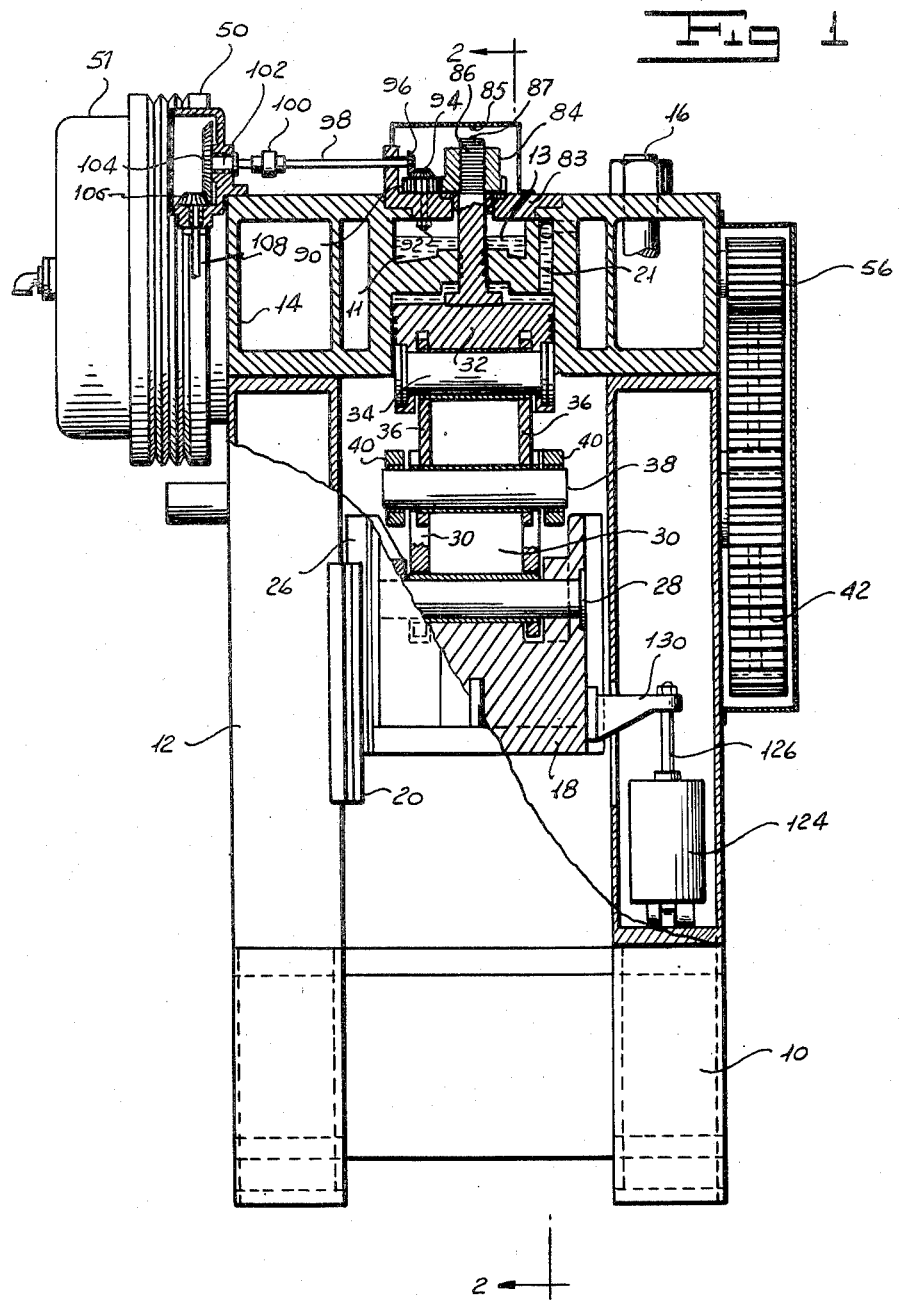
Figure 1 is an elevation of a knuckle joint press with parts in section and parts broken away showing one embodiment of my invention.

More particularly referring now to the drawings, the press frame comprises a base 10, side members 12 and upper portion or crown 14 held together by a plurality of tie rods 16. A slide 18 is reciprocable in the frame of the press. It is guided by a pair of front gibs 20 and a pair of rear gibs 22 secured to the side members 12 in any suitable manner. Ways 24 provide friction surfaces between the slide 18 and the rear gibs 22. Angularly disposed ways 26 provide friction surfaces between the slide and the front gibs 20. The angular disposition of the ways 26 and the gibs 20 provide a means for adjusting the slide laterally. Gibs 20 and 22 are provided with any convenient adjusting means known to the art, such as adjusting screws (not shown). Patent No. 1,774,245, issued on August 26, 1930 to R. W. Strout discloses one means which may be employed to adjust the gibs 20 of applicant's construction. Moving the right-hand gib 20 as seen in Figure 3 inwardly and the left-hand gib 20 outwardly will cam the slide to the left. Moving both rear gibs 22, together with both front gibs 20, to the rear permits the slide to move to the rear. In this manner the slide can be accurately positioned with respect to the frame. Adjacent the upper end of the slide and carried thereby I provide a wrist pin 28 by which the lower link 30 of a toggle linkage is pivotally secured to the slide. The crown 14 is formed with an internal cylinder in which I mount a thrust piston 32. The thrust piston carries a wrist pin 34 by which the upper link 36 of the toggle linkage is pivotally secured to the thrust piston 32. The other ends of links 30 and 36 are pivotally interconnected by the knuckle joint pin 38, to which pin the lower end of a pitman 40 is likewise secured. A gear 42 is mounted for rotation about a shaft 44 and carries an eccentric pin 46 to which the other end of the pitman 40 is secured.

A power source such as an electric motor or the like 48 is carried by the crown of the press in any suitable manner. The motor drives a flywheel 50 through a plurality of V-belts 52 and rotates it constantly. A clutch disposed in a housing 51 is adapted to clutch the flywheel 50 to the shaft 54. Secured to this shaft for rotation therewith I provide a pinion 56 which meshes with the teeth of the crank gear 42. The shaft 54 is normally immobilized by a brake which is set whenever the clutch is not engaged. The brake is also disposed in the housing 51, and may have any suitable construction known to the art. The brake and clutch assembly of power presses is usually operated by compressed air. The arrangement is such that a spring normally sets the brake and releases the clutch. When compressed air is applied the clutch is engaged and the brake is released. The compressed air is controlled by a valve. One type of air operated clutch and brake assembly, which I may employ is disclosed in Patent No. 2,581,637 issued January 8, 1952 to P. H. Danly et al.

A piston rod 82 is carried by the thrust piston 32 and extends upwardly through the upper portion of the press crown. A nut 84 is carried by the threaded portion 86 of the piston rod 82. This nut is provided with gear teeth 88 which are engaged by a pinion 90 mounted on a shaft 92 carried by the crown of the press. The shaft 92 carries a bevel gear 94 which meshes with a bevel gear 96 carried by a shaft 98 for rotation therewith. The shaft 98 is coupled by coupling 100, as shown in Figure 1, to a stub shaft 102 to which is secured a bevel gear 104. This bevel gear meshes with a bevel gear 106 carried by a shaft 108 adapted to be driven by any convenient means known to the art, such as an electric motor (not shown). The rotation of shaft 108 will rotate the nut 84 through the gear train just described. The engagement of nut 84 with a cover 83 positioned in the top of the crown 14 will determine how far downwardly the thrust piston 32 can move.

Referring now to Figure 5, the crown 14 is formed with a reservoir 11 in which I position a supply of hydraulic fluid 13. The cover 83 is positioned in the opening in the crown 14 above the reservoir 11 to close the reservoir. A pipe 15 communicates with a compressed air source, not shown, and with the reservoir 11 above the level of the hydraulic fluid 13 through a check valve 17. The pressure of the compressed air above the hydraulic fluid 13 is not very great and may be in the order, say, of one hundred pounds per square inch. Hydraulic fluid is forced by the air pressure past check valve 19 through bore 21 into the space 23 in the cylinder formed in the crown 14 above the piston 32. The bore 21 communicates with a bore 110 formed in the crown of the press. A plunger 114 carries a valve 112 which normally seats on a valve seat 111 and closes the outer end of bore 110. The plunger is secured to an air piston 116 positioned in a cylinder 118 with which a pipe 120 communicates. The space 23 from the portion above the thrust piston 32 to the valve 112 is completely filled with hydraulic fluid 13 of any suitable type such as oil or a mixture of glycerine and water. It will be noted that the area of the piston 116 is very much greater than the area of the valve 112. In this manner a comparatively low air pressure applied through pipe 120 to the top of the piston 116 will maintain a comparatively high hydraulic pressure within the hydraulic system.

Let us assume that the knuckle joint press in which my safety system is incorporated was designed for a working thrust of three hundred tons. Let us asssume further that the space 23, the bore 21 and the bore 110 are completely filled with hydraulic fluid. This hydraulic fluid is under the comparatively slight pressure of one hundred pounds per square inch occasioned by the air pressure through pipe 15 which is adapted to communicate with the hydraulic fluid through check valves 17 and 19. Sufficient air pressure is applied to pipe 120 so that, at pressures equivalent to three hundred tons on the knuckle joint press slide, the valve 112 will be maintained on its seat. As the thrust is impressed upon the press slide it will be communicated to the thrust piston 32 and hence to the valve 112 through the hydraulic system. If this three-hundred-ton pressure is exceeded, the valve 19 will be forced on to its seat and the valve 112 will be displaced from its seat to relieve the excess pressure. Hydraulic fluid escaping past the valve will flow through duct 113 back to the reservoir 11. It is to be noted, however, that in escaping the oil wiredraws by the valve and its seat maintaining a pressure equivalent to three hundred tons to oppose the piston 32 all during the working stroke. There is no sudden lifting of a relief valve and the venting of pressure. The pressure is maintained at the working pressure during the working part of the stroke. In this manner the movement of the thrust piston 32 will accommodate for differences in stock within limits while maintaining the desired force upon the slide of the press. Should an excessive load be placed on the press beyond the limits of the movement of the thrust piston 32, the switch point 85 carried at the top of rod 82 will make contact with switch point 87 carried by insulating mounting 89 to de-energize a conventional control solenoid of the press, thus stopping the press by setting the brake and releasing the clutch. Patent No. 2,735,976 issued February 21, 1956, to J. C. Danly discloses a power press circuit including a solenoid air valve winding which may be deenergized by a conventional relay energized when switch points 85 and 87 engage.

If the thrust piston 32 should be displaced upwardly during a working stroke, as soon as the load is relieved from the press, make-up hydraulic fluid from the reservoir 11 will be forced by the superimposed air pressure on the reservoir past check valve 19 through bore 21 back to space 23 above the thrust piston 32, automatically replenishing the hydraulic fluid for the next cycle.

It will be noted, further, that the return duct 113 is not at atmospheric pressure but under the superatmospheric pressure occasioned by the air pressure upon the hydraulic fluid 13 within the reservoir 11. It is the venting of the hydraulic fluid to a space under superatmospheric pressure instead of to atmospheric pressure which enhances the wiredrawing effect and prevents a sudden release of pressure which will permit the piston 32 to move rapidly upwardly to its full limit and stop the press slide.

As can be seen by reference to Figure 1, a balancing cylinder 124 is provided with a piston to which a piston rod 126 is secured. The piston rod 126 is attached to a lug 130 carried by the slide 18 of the press. Air under sufficient pressure to counterbalance the weight of the slide and associated parts is fed to the cylinder 124 from any suitable source of air under pressure known to the art but not shown.

Figure 2:
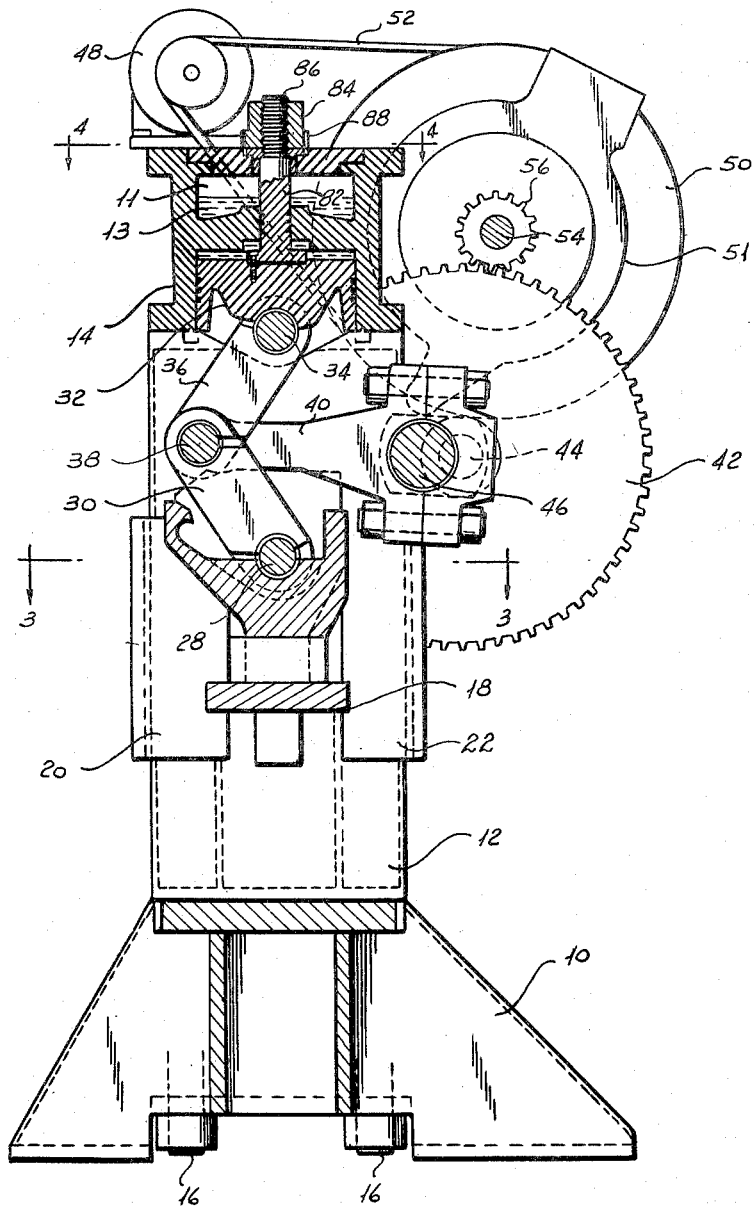
Figure 2 is a partial sectional view taken along the line 2—2 of Figure 1.

In operation, the shaft 108 is rotated by any appropriate means (not shown) to adjust the position of the slide for the particular dies carried by the slide and the bed of the press. The motor 48 is set into operation rotating the flywheel 50. Air under the proper pressure is fed through pipe 120 firmly to seat the valve 112. The air pressure upon the hydraulic fluid through pipe 15 will seat the thrust piston 32 downwardly. When the clutch is engaged, the pinion 56 will drive the gear 42 and rotate the crank pin 46. This will reciprocate the pitman 40 with simple harmonic motion and move the knuckle joint pin 38 to the left and to the right, as viewed in Figure 2. When the knuckle pin 38 moves to the left the slide 18 will move upwardly. When the knuckle pin 38 moves to the right as viewed in Figure 2 the slide will move downwardly. When the toggle links 30 and 36 form a straight angle the slide will be at its lowermost position and just before it reaches this position it will exercise the greatest thrust.

Due to the fact that the bed of the press is not movable an automatic feed can be readily employed with my knuckle joint press thus accomplishing one of the objects of my invention. If several thicknesses of stock are inadvertently fed to the dies the increases in forces involved will cause the thrust piston 32 to move upwardly protecting the die and the press parts from injury. This upward motion, it will be seen, causes an increase in pressure in the hydraulic and pneumatic system. When the increase passes a predetermined limit the valve 112 will be unseated slightly releasing the excess pressure. It is to be noted that at all times, however, the effective working pressure, which in this case will be three hundred tons, is maintained.

If at the time the press is stopped the slide is stuck at bottom dead center the compressed air supply to the air cylinder 118 may be shut off by manual operation of valve 122. The valve 123 may be opened manually so that compressed air can escape through pipe 121 to the atmosphere thus bleeding the compressed air in the air cylinder to the atmosphere a sufficient extent to permit the press to be freed. It will readily be appreciated that this operation may be accomplished by manual actuation of a conventional valve in supply pipe 120 and the valve 123.

It will be understood that certain features and sub-combinations are of utility and may be employed without reference to other features and subcombinations. This is contemplated by and is within the scope of my claim. It is further obvious that various changes may be made in details within the scope of my claim without departing from the spirit of my invention. It is therefore to be understood that my invention is not to be limited to the specific details shown and described.

Having thus described my invention, what I claim is:

In a press having a crown and a slide, a cylinder formed in the crown, a thrust piston mounted in the cylinder, a closed hydraulic system comprising a head of hydraulic fluid in said cylinder over said piston, a reservoir, hydraulic fluid in said reservoir, means providing communication between said cylinder and said reservoir, a check valve disposed in said communicating means for permitting flow of hydraulic fluid from said reservoir to said cylinder, a valve for bleeding hydraulic fluid from said cylinder to said reservoir, pneumatic means for seating said bleeder valve at a predetermined pressure, a toggle linkage connecting said piston to said slide and means for stopping the press slide upon a predetermined movement of the thrust piston.

References Cited in the file of this patent
UNITED STATES PATENTS

| | | |
|---|---|---|
| 1,077,840 | Kinzer | Nov. 4, 1913 |
| 1,481,806 | Montgomery | Jan. 29, 1924 |
| 1,859,058 | Stacy | May 17, 1932 |
| 2,054,428 | Klocke | Sept. 15, 1936 |
| 2,164,640 | Cannon | July 4, 1939 |
| 2,236,154 | Patrick et al. | Mar. 25, 1941 |
| 2,249,149 | MacMillin | July 15, 1941 |
| 2,269,758 | De Noronha | Jan. 13, 1942 |
| 2,293,815 | Gates | Aug. 25, 1942 |
| 2,320,103 | Seidel et al. | May 25, 1943 |
| 2,389,818 | Rode et al. | Nov. 27, 1945 |
| 2,522,450 | Johansen | Sept. 12, 1950 |